US012658515B2

(12) United States Patent
Aitharaju et al.

(10) Patent No.: US 12,658,515 B2
(45) Date of Patent: Jun. 16, 2026

(54) COMPOSITE COVER AND METHOD OF MANUFACTURING THE COVER

(71) Applicant: GM GLOBAL TECHNOLOGY OPERATIONS LLC, Detroit, MI (US)

(72) Inventors: Venkateshwar R. Aitharaju, Troy, MI (US); Xiaosong Huang, Novi, MI (US); Gustavo Cibrian Salazar, Belle River (CA)

(73) Assignee: GM Global Technology Operations LLC, Detroit, MI (US)

( * ) Notice: Subject to any disclaimer, the term of this patent is extended or adjusted under 35 U.S.C. 154(b) by 1154 days.

(21) Appl. No.: 17/575,901

(22) Filed: Jan. 14, 2022

(65) Prior Publication Data

US 2023/0231254 A1 Jul. 20, 2023

(51) Int. Cl.
| | |
|---|---|
| *H01M 50/229* | (2021.01) |
| *B32B 3/08* | (2006.01) |
| *B32B 5/02* | (2006.01) |
| *B32B 5/26* | (2006.01) |
| *B32B 15/14* | (2006.01) |

(Continued)

(52) U.S. Cl.
CPC ............. *H01M 50/229* (2021.01); *B32B 3/08* (2013.01); *B32B 5/02* (2013.01); *B32B 5/26* (2013.01); *B32B 15/14* (2013.01); *B32B 15/18* (2013.01); *B32B 15/20* (2013.01);

(Continued)

(58) Field of Classification Search
CPC .. B32B 5/02; B32B 5/028; B32B 5/26; B32B 15/14; B32B 15/20; B32B 15/18; B32B 15/08; B32B 15/092; B32B 15/098; B32B 15/085; B32B 2457/10; H01M 50/224; H01M 50/229; H01M 50/231; H01M 50/244; H01M 50/253; H01M 50/28
See application file for complete search history.

(56) References Cited

U.S. PATENT DOCUMENTS

| | | | |
|---|---|---|---|
| 2020/0119317 A1 | 4/2020 | Nakabayashi et al. | |
| 2020/0152926 A1 | 5/2020 | Wynn et al. | |

(Continued)

FOREIGN PATENT DOCUMENTS

| | | | |
|---|---|---|---|
| CN | 109689345 A | 4/2019 | |
| WO | WO-2018007814 A1 * | 1/2018 | ......... B29C 35/0266 |
| WO | WO-2021034420 A1 * | 2/2021 | .......... H01M 50/204 |

*Primary Examiner* — Holly Rickman
(74) *Attorney, Agent, or Firm* — Quinn IP Law

(57) ABSTRACT

A composite cover includes a generally rectangular main portion having four main portion edges about a perimeter of the main portion and having opposing top and bottom surfaces defining respective upward and downward directions, and four generally rectangular side portions each contiguous with and extending downward from a respective one of the main portion edges. The main portion and the four side portions generally enclose an interior space and are made of a sandwich structure comprising an interior layer of continuous fiber reinforcements and resin and an exterior layer of metallic foil bonded to the interior layer. A method of manufacturing the cover, having a desired shape generally of a five-walled open box, includes attaching a formed sheet made of metallic foil and having the desired shape onto a shaped composite preform disposed in the desired shape, wherein the shaped composite preform is made of continuous fiber reinforcements and resin.

10 Claims, 11 Drawing Sheets

(51) Int. Cl.
 *B32B 15/18* (2006.01)
 *B32B 15/20* (2006.01)

(52) U.S. Cl.
 CPC ... *B32B 2260/021* (2013.01); *B32B 2260/046* (2013.01); *B32B 2457/10* (2013.01)

(56) References Cited

U.S. PATENT DOCUMENTS

2022/0017685 A1* 1/2022 Balijepalli ........... C08K 5/5377
2022/0320657 A1* 10/2022 Wang ................. H01M 50/276

* cited by examiner

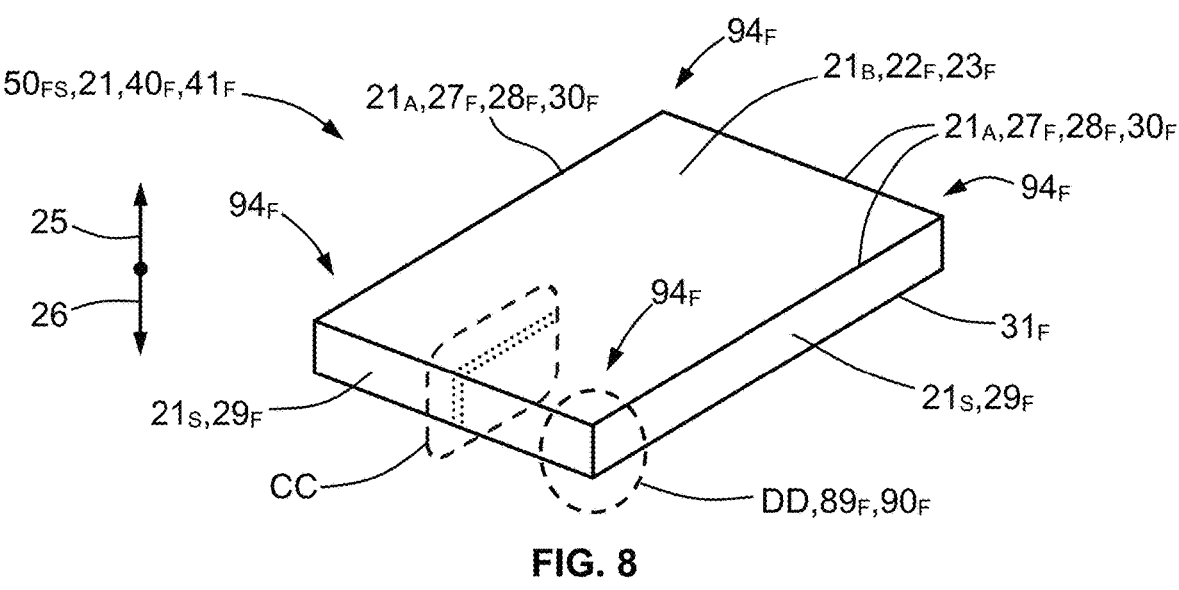
FIG. 8
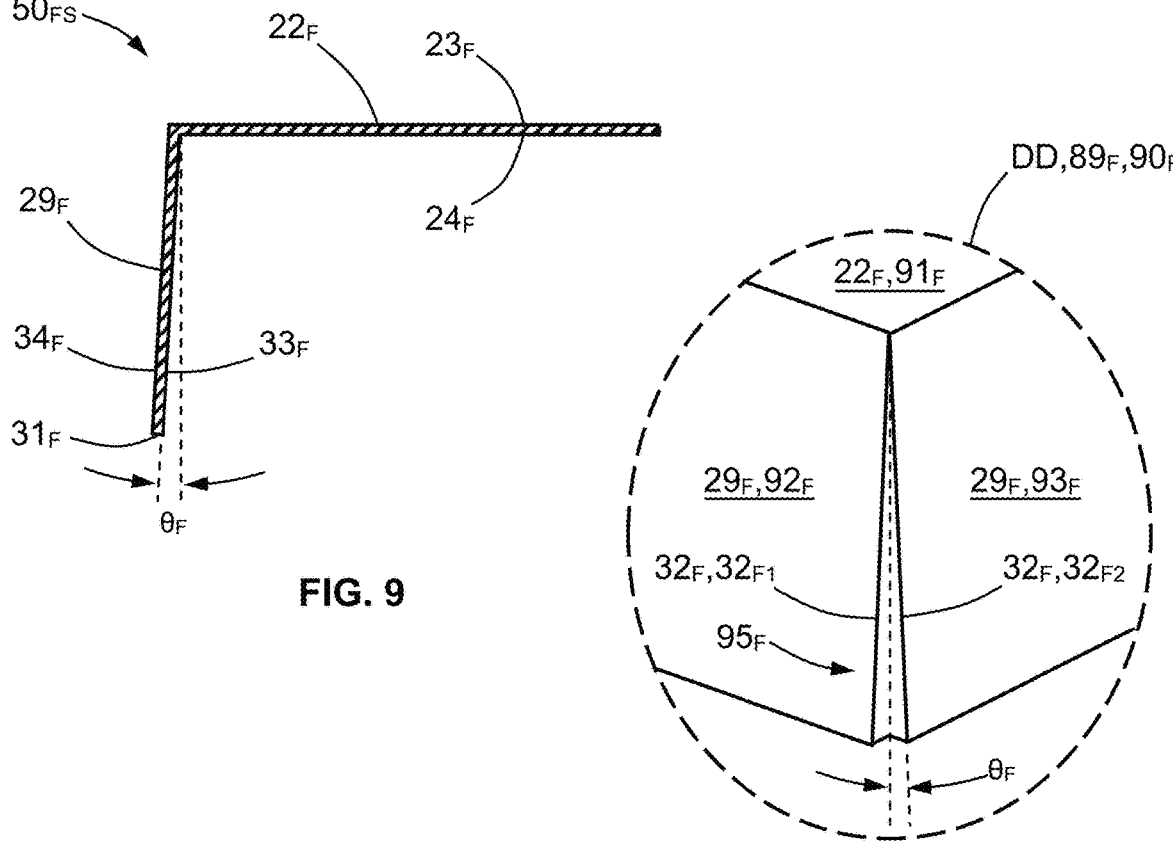
FIG. 9
FIG. 10

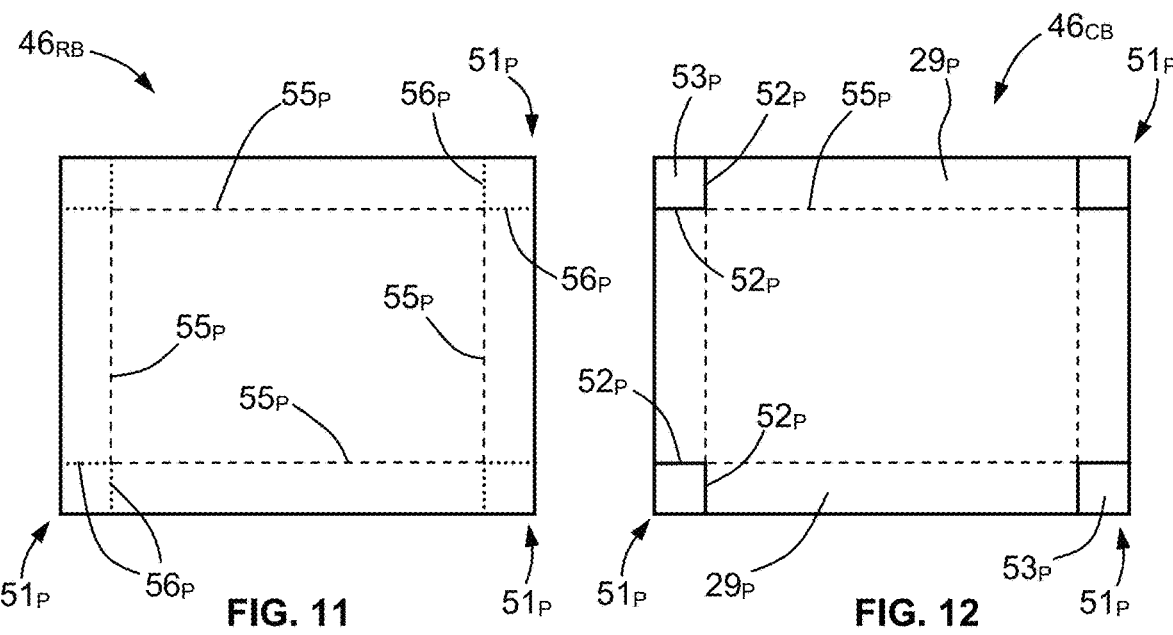
FIG. 11
FIG. 12
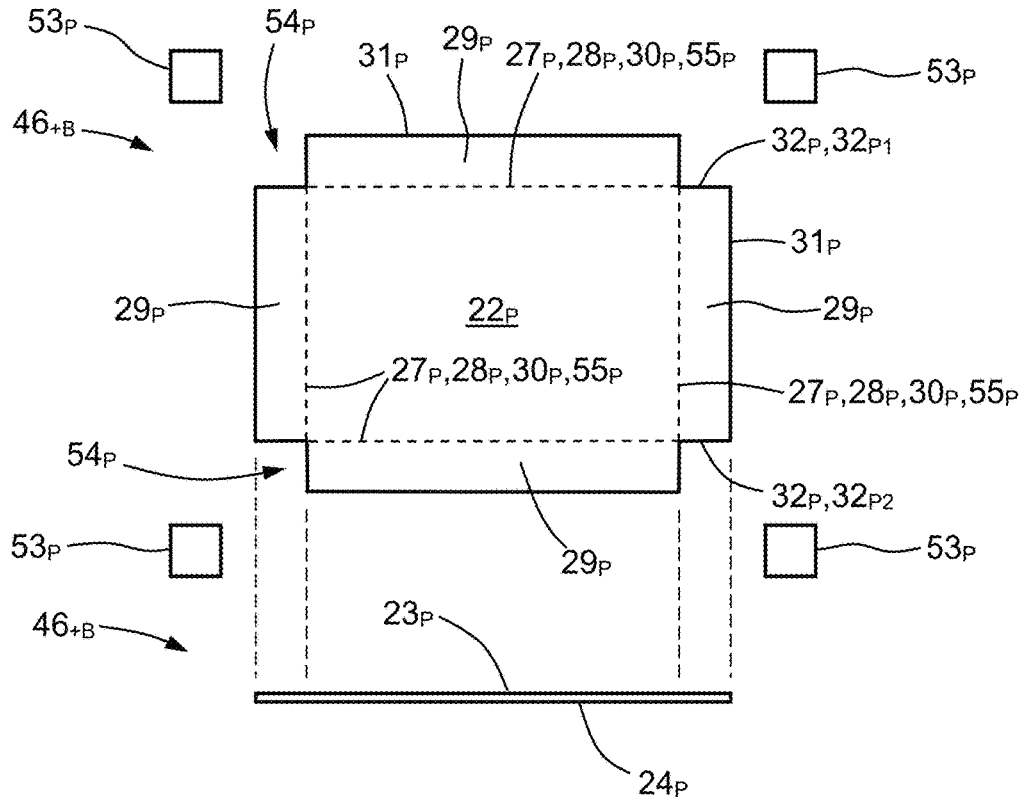
FIG. 13

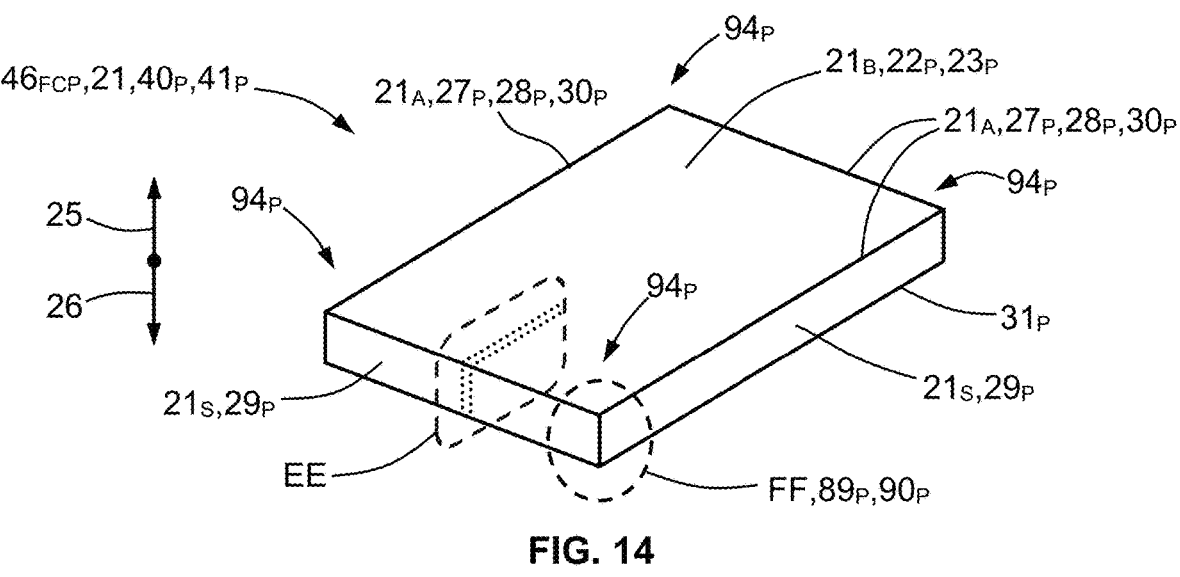
FIG. 14
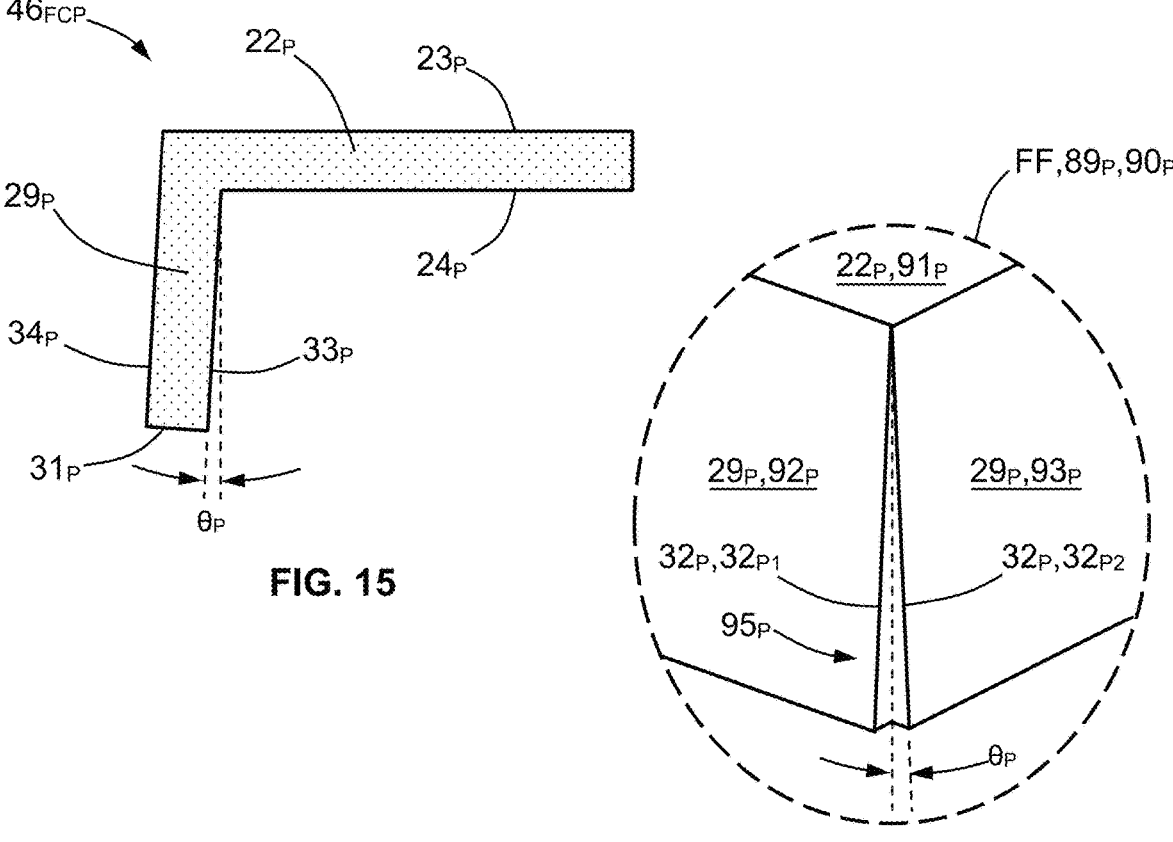
FIG. 15
FIG. 16

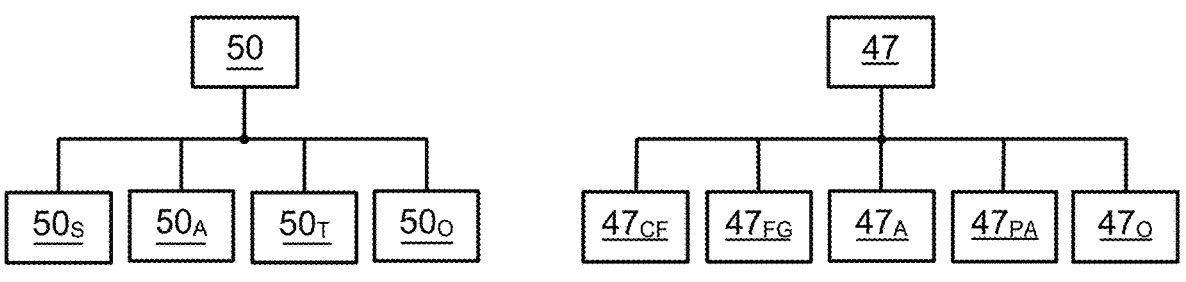
FIG. 25                                FIG. 26
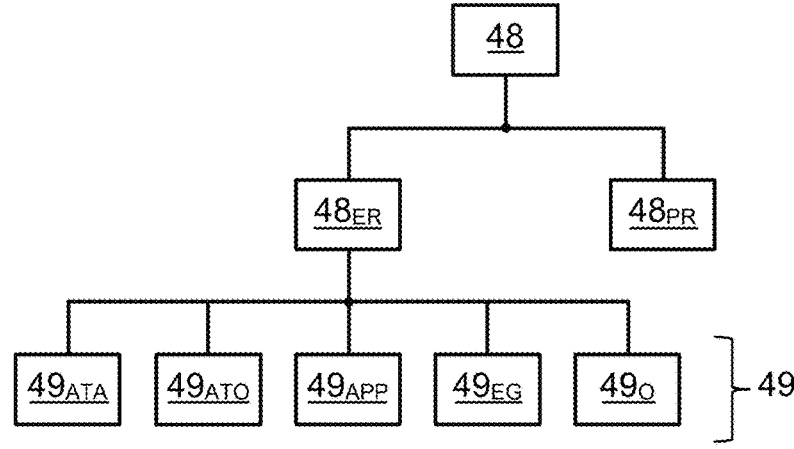
FIG. 27
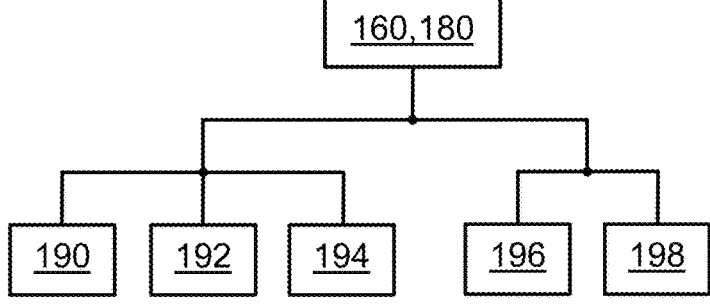
FIG. 28

COMPOSITE COVER AND METHOD OF MANUFACTURING THE COVER

INTRODUCTION

This disclosure relates generally to composite protective covers, such as for high-voltage batteries.

Batteries and other electrical or electronic devices are typically housed in an enclosure or housing. These enclosures or housings may generally take the form of a five-sided open box with a lid or cover used to cover the opening. Such enclosures are typically constructed to be very tough and durable, and may involve the use of various fiber-reinforced materials. However, it may be challenging to adequately form a lid or cover using such materials when the lid or cover is designed to have a deep draw.

SUMMARY

According to one embodiment, a composite cover includes a generally rectangular main portion having four main portion edges about a perimeter of the main portion and having opposing top and bottom surfaces defining respective upward and downward directions, and four generally rectangular side portions each contiguous with and extending downward from a respective one of the main portion edges. The main portion and the four side portions generally enclose an interior space and are made of a sandwich structure comprising an interior layer of continuous fiber reinforcements and resin and an exterior layer of metallic foil bonded to the interior layer.

The continuous fiber reinforcements may include at least one of carbon fiber, fiberglass, aramid and polyamide, and may have an average nominal fiber length of at least 500 mm and a stiffness of at least 40 GPa. The resin may include an epoxy resin with additives mixed therein or a phenolic resin, wherein the additives include at least one of aluminum trihydrate, aluminum trihydroxide, ammonium polyphosphate and expandable graphite. The metallic foil may be made of at least one of steel, aluminum and titanium and has a thickness of 0.1 to 1.0 mm. Additionally, as viewed from above, the composite cover may have four generally right-angled top corners, each of which may be either generally pointed or generally rounded.

Each of the side portions may have respective first and second lateral edges extending generally downward, such that each of the first and second lateral edges of each side portion is separated by a respective gap from a respective neighboring second or first lateral edge of a respective neighboring side portion, with the composite cover further including: (i) one or more top strengthening patches, wherein each top strengthening patch is disposed between and bonded to the interior and exterior layers and covers a respective gap; and/or (ii) one or more bottom strengthening patches, wherein each bottom strengthening patch is bonded onto an interior surface of the interior layer and covers a respective gap. Alternatively, each of the side portions may have respective first and second lateral edges extending generally downward, such that each of the first and second lateral edges of each side portion overlaps with a respective neighboring second or first lateral edge of a respective neighboring side portion.

Each of the top and bottom strengthening patches may include a respective first portion which covers the respective gap and a respective second portion which extends across the main portion. The composite cover may have four corner junctures, with each corner juncture having a respective corner juncture volume thereabout, and with each corner juncture volume comprising a respective first segment of the main portion, a respective second segment of an adjacent one of the side portions, and a respective third segment of another adjacent one of the side portions. The interior layer may be made of a plurality of individual layers of the continuous fiber reinforcements and resin, wherein each individual layer includes two or more respective sheets of the continuous fiber reinforcements disposed in-plane with each other, with each of the two or more respective sheets of each individual layer separated from one or more neighboring others of the two or more respective sheets by one or more respective elongated voids. A respective group of the elongated voids may be located within each corner juncture volume such that the elongated voids of each respective group run generally parallel to each other and are staggered and non-overlapping with respect to each other.

Each of the elongated voids located within each respective corner juncture volume may extend through the respective first segment of the respective corner juncture volume, and through either of the respective second and third segments of the respective corner juncture volume. The metallic foil may have a main foil portion having four main foil portion edges about a main foil perimeter of the main foil portion, and four generally rectangular foil side portions each contiguous with and extending downward from a respective one of the main foil portion edges. Each of the foil side portions may have respective first and second lateral foil edges extending generally downward, such that each of the first and second lateral foil edges of each foil side portion is separated by a respective foil gap from a respective neighboring second or first lateral foil edge of a respective neighboring foil side portion.

According to another embodiment, a composite battery cover includes a generally rectangular main portion having four main portion edges about a perimeter of the main portion and having opposing top and bottom surfaces defining respective upward and downward directions, and four generally rectangular side portions each contiguous with and extending downward from a respective one of the main portion edges.

The main portion and the four side portions generally enclose an interior space and are made of a sandwich structure comprising an interior layer of continuous fiber reinforcements and resin and an exterior layer of metallic foil bonded to the interior layer. The continuous fiber reinforcements include at least one of carbon fiber, fiberglass, aramid and polyamide, and have an average nominal fiber length of at least 500 mm and a stiffness of at least 40 GPa. The resin includes an epoxy resin with additives mixed therein or a phenolic resin, wherein the additives include at least one of aluminum trihydrate, aluminum trihydroxide, ammonium polyphosphate and expandable graphite. The metallic foil is made of at least one of steel, aluminum and titanium and has a thickness of 0.1 to 1.0 mm. Additionally, the composite cover, as viewed from above, has four generally right-angled top corners, each of which is either generally pointed or generally rounded.

According to yet another embodiment, a method of manufacturing a composite cover having a desired shape generally of a five-walled open box includes attaching a formed sheet made of metallic foil and having the desired shape onto a shaped composite preform disposed in the desired shape, wherein the shaped composite preform is made of continuous fiber reinforcements and resin.

The method may include: providing a generally plus-sign-shaped sheet made of metallic foil and configured to be disposed in the desired shape, wherein the sheet has a generally rectangular main foil portion having four main foil portion edges about a main foil perimeter of the main foil portion, and four generally rectangular foil side portions each having a respective proximal foil long edge contiguous with a respective one of the main foil portion edges; and bending each of the foil side portions along its respective proximal foil long edge to produce the formed sheet. The method may additionally include cutting slits in a generally rectangular sheet made of metallic foil and having four first corners so as to remove a generally rectangular-shaped first section of the generally rectangular sheet from each of the four first corners to produce the generally plus-sign-shaped sheet.

The method may also include: presenting a generally plus-sign-shaped blank made of continuous fiber reinforcements and resin and configured to be disposed in the desired shape, wherein the blank has a generally rectangular main preform portion having four main preform portion edges about a main preform perimeter of the main preform portion, and four generally rectangular preform side portions each having a respective proximal preform long edge contiguous with a respective one of the main preform portion edges; folding each of the preform side portions along its respective proximal preform long edge to produce a folded composite preform, wherein each of the preform side portions has respective first and second lateral preform edges extending away from the main preform portion, such that each of the first and second lateral preform edges of each preform side portion is separated by a respective gap from a respective neighboring second or first lateral preform edge of a respective neighboring preform side portion; and either (i) covering each respective gap with at least one of a top strengthening patch placed on a top surface of the folded composite preform and a bottom strengthening patch on a bottom surface of the folded composite preform, thereby producing the shaped composite preform, or (ii) overlapping each first lateral preform edge with the neighboring second lateral preform edge, thereby producing the shaped composite preform. Additionally, the method may include making cuts in a generally rectangular blank made of continuous fiber reinforcements and resin and having four second corners so as to remove a generally rectangular-shaped second section of the generally rectangular blank from each of the four second corners to produce the generally plus-sign-shaped blank.

The method may further include forming the shaped composite preform, wherein the shaped composite preform has a generally rectangular main preform portion having four main preform portion edges about a main preform perimeter of the main preform portion, and four generally rectangular preform side portions each having a respective proximal preform long edge contiguous with a respective one of the main preform portion edges. The shaped composite preform may have four preform corner junctures, with each preform corner juncture having a respective preform corner juncture volume thereabout, and with each preform corner juncture volume comprising a respective first preform segment of the main preform portion, a respective second preform segment of an adjacent one of the preform side portions, and a respective third preform segment of another adjacent one of the preform side portions. The shaped composite preform may be made of a plurality of individual layers of the continuous fiber reinforcements and resin, wherein each individual layer includes two or more respective sheets of the continuous fiber reinforcements disposed in-plane with each other, with each of the two or more respective sheets of each individual layer separated from one or more neighboring others of the two or more respective sheets by one or more respective elongated voids, wherein a respective group of the elongated voids is located within each preform corner juncture volume such that the elongated voids of each respective group run generally parallel to each other and are non-overlapping with respect to each other.

The shaped composite preform may be fabricated in the desired shape by a tailored fiber placement process. The attaching step may include curing the shaped composite preform in the desired shape to produce a cured shaped composite preform, and bonding the formed sheet onto the cured shaped composite preform with an adhesive. The attaching step may also include fitting the formed sheet onto the shaped composite preform to produce a sheet-preform assembly having the desired shape, placing the sheet-preform assembly into a mold, and curing the sheet-preform assembly in the mold.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 8 is a schematic perspective view of a formed sheet of metallic foil.

FIG. 9 is a schematic cross-sectional view of the formed sheet of FIG. 8 within the dashed rounded rectangle CC.

FIG. 10 is a schematic close-up view of a corner of the formed sheet of FIG. 8 within the dashed ellipse DD.

FIG. 11 is a schematic plan view of a rectangular blank of CFR/resin.

FIG. 12 is a schematic plan view of the rectangular blank of FIG. 11 after being cut to form a cut blank of CFR/resin.

FIG. 13 are schematic plan and elevation views of the cut blank of FIG. 12 after removal of the cut corner sections to form a plus-sign-shaped blank of CFR/resin.

FIG. 14 is a schematic perspective view of a folded composite preform of CFR/resin.

FIG. 15 is a schematic cross-sectional view of the folded composite preform of FIG. 14 within the dashed rounded rectangle EE.

FIG. 16 is a schematic close-up view of a corner of the folded composite preform of FIG. 14 within the dashed ellipse FF.

FIG. 25 is a block diagram of metals which may be used for the metallic foil.

FIG. 26 is a block diagram of materials which may be used for the CFR.

FIG. 27 is a block diagram of materials which may be used for the resin.

FIG. 28 is a block diagram of molding processes and molds which may be used for the curing step.

DETAILED DESCRIPTION

Figure 1:
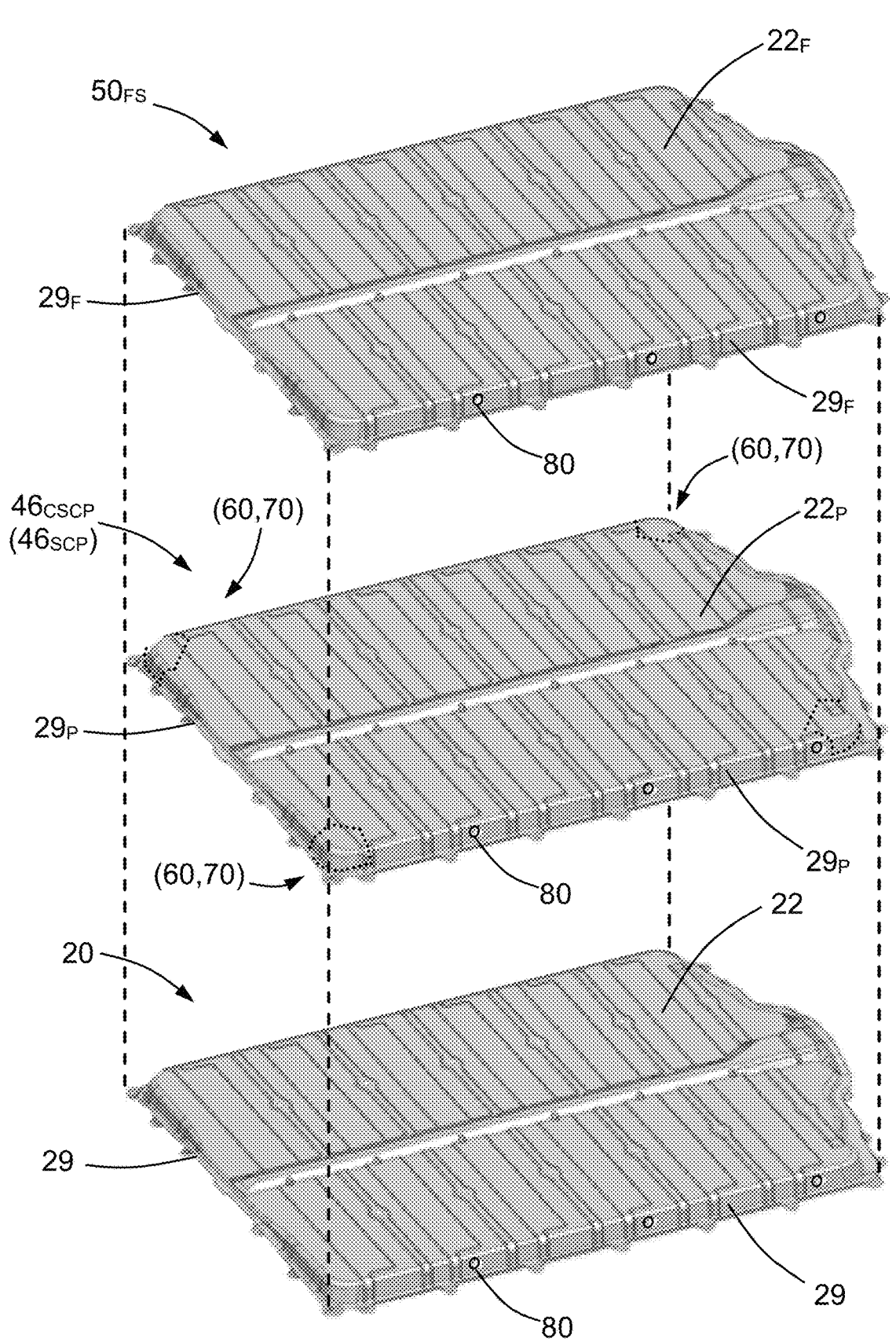
FIG. 1 is an exploded perspective view of a formed metallic foil sheet and a composite preform, and a resulting composite cover.

Referring now to the drawings, wherein like numerals indicate like parts in the several views, a composite cover 20, and a method 100 for manufacturing the composite cover 20, are shown and described herein.

Figures 2, 3, 4:
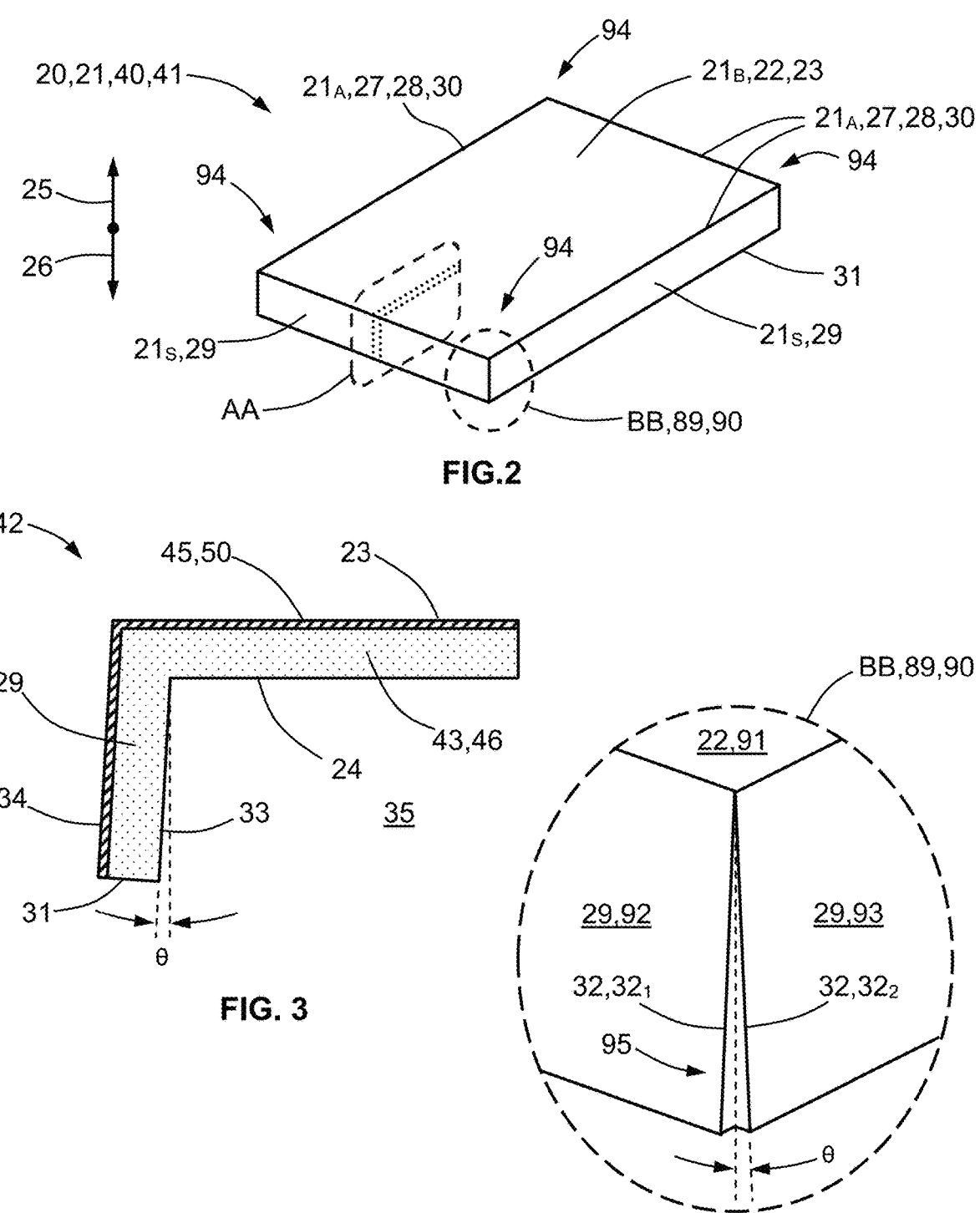
FIG. 2 is a schematic perspective view of a composite cover.
FIG. 3 is a schematic cross-sectional view of the composite cover of FIG. 2 within the dashed rounded rectangle AA.
FIG. 4 is a schematic close-up view of a corner of the composite cover of FIG. 2 within the dashed ellipse BB.

The composite cover 20 may be used as a cover or lid for a battery, such as a high-voltage battery. The composite cover 20 may have a desired shape 21 like a five-sided or five-walled shallow, rectangular open box, such as illustrated in FIGS. 2, 8 and 14. For example, the desired shape 21 may have a relatively large and generally flat rectangular top or base $21_B$ having a perimeter or outer ambit $21_A$ that is generally rectangular. The perimeter or outer ambit $21_A$ may have four corners 94 that are either sharply defined or relatively rounded, with four side walls $21s$ extending downward from the respective four sides of the perimeter/outer ambit $21_A$. The desired shape 21, and the composite cover 20 itself in normal use, may be oriented with the opening of the box-like shape facing downward.

The composite cover 20 also utilizes composite preforms 46 that are made of continuous fiber reinforcements ("CFR") 47 having an average nominal fiber length of at least 500 mm and a stiffness of at least 40 GPa. This is in contrast to the more traditional short/medium fibers which have an average nominal fiber length of about 25-50 mm and a stiffness of about 11 GPa, and very small fibers which have an average nominal fiber length of about 0.1 mm. Although the use of such longer-than-usual CFRs 47 poses some design and manufacturing challenges, such as when making deep-draw covers and the like, the inventors of the embodiments described below have discovered novel and inventive ways to use such CFRs 47 to design structures and methods which provide benefits and advantages which were heretofore unknown.

FIG. 1 shows an exploded perspective view of a formed metallic foil sheet $50_{FS}$ which may be bonded onto a cured, shaped composite preform $46_{CSCP}$, with a resulting composite cover 20 shown at the bottom of the drawing. Or, as an alternative indicated by the parentheses and dotted lines, the formed metallic foil sheet $50_{FS}$ may be fitted onto an uncured shaped composite preform $46_{SCP}$ having top and bottom strengthening patches 60, 70, with the combination of the formed sheet $50_{FS}$ and the uncured preform $46_{SCP}$ with patches 60, 70 being placed in a mold to cure the resin and produce the resulting composite cover 20.

In the present disclosure, two different but related structures will be described for the composite cover 20, and two different but related processes or methods 100 will be described for manufacturing the composite cover 20. For convenience, reference may be made herein to four different but related embodiments: (i) a first embodiment or structure, in which each of the four corners of the composite preform 46 has a gap $95_P$ covered by top and bottom strengthening patches 60, 70; (ii) a second embodiment or structure, in which each of the four corners of the composite preform 46 has a group 99 of staggered, non-overlapping elongated voids 98 (but no top and bottom strengthening patches 60, 70); (iii) a third embodiment or method 100, in which the composite cover 20 is manufactured by curing a shaped but uncured preform $46_{SCP}$ to create a cured preform $46_{CSCP}$ and then bonding the formed sheet $50_{FS}$ of metallic foil 50 onto the cured preform $46_{CSCP}$; and (iv) a fourth embodiment or method 100, in which the composite preform 20 is manufactured by co-molding the formed sheet $50_{FS}$ and the uncured preform $46_{SCP}$ together in a mold, thereby curing the uncured preform $46_{SCP}$ and creating a cured preform $46_{CSCP}$ with the formed sheet $50_{FS}$ attached via the co-molding process 194. As described below, the first and second embodiments share a common structure, while the third and fourth embodiments share a common starting point or process.

Throughout the description and drawings, it may be noted that the metallic sheet 50, the composite preform 46 and the composite cover 20 may each pass through various stages in the manufacturing process, with the metallic sheet 50, the composite preform 46 and the composite cover 20 each existing as a distinct "morph" after each manufacturing stage. For example, as further explained below, the formed metallic foil sheet $50_{FS}$ may begin as a generally rectangular sheet $50_{RS}$, which may then be formed into a slitted sheet $50_{SS}$, then into a plus-sign-shaped sheet $50_{+S}$, and then finally into a formed sheet $50_{FS}$. Also, it may be noted that certain elements appear as part of the metallic sheet 50, the composite preform 46 and the composite cover 20, such as the generally rectangular main portion 22, the generally rectangular main foil portion $22_F$, the generally rectangular main preform portion $22_P$. Thus, certain reference numerals (e.g., "22") may be used to indicate an element (e.g., a "main portion") that appears in similar fashion among all three of the metallic sheet 50, the composite preform 46 and the composite cover 20; in such cases, a subscript "F" or "P" is used along with the reference numeral to indicate that the element belongs to the "foil" or the "preform", respectively, with the absence of a subscript indicating that the element belongs to the overall composite cover 20.

According to the first and second embodiments, and referring to FIGS. 2-4, the composite cover 20 includes a generally rectangular main portion 22 having four main portion edges 27 about a perimeter 28 of the main portion 22. The main portion 22 has opposing top and bottom surfaces 23, 24 defining respective upward and downward directions 25, 26. In addition to the main portion 22, the composite cover 20 also includes four generally rectangular side portions 29 each contiguous with and extending downward from a respective one of the main portion edges 27. The main portion 22 and the four side portions 29 generally enclose an interior space 35 defining an inward or interior direction 37 pointing toward the interior space 35, and an outward or exterior direction 38 pointing away from the interior space 35. The main portion 22 and the four side portions 29 are made of a sandwich structure 42 comprising an interior layer 43 made of CFR 47 and resin 48 and an exterior layer 45 made of metallic foil 50 bonded to the interior layer 43. The composite cover 20 also optionally include one or more thermal vent orifices 80 formed through the interior and exterior layers 43, 45.

The CFR 47 may be carbon fiber $47_{CF}$, fiberglass $47_{FG}$, aramid $47_A$, polyamide $47_{PA}$, or other similar material $47_O$ (see FIG. 26) and may have an average nominal fiber length of at least 500 mm and a stiffness of at least 40 GPa. The resin 48 may include an epoxy resin $48_{ER}$ with additives 49 mixed therein, or a phenolic resin $48_{PR}$, wherein the additives 49 include one or more of aluminum trihydrate $49_{ATA}$, aluminum trihydroxide $49_{ATH}$, ammonium polyphosphate $49_{APP}$, expandable graphite $49_{EG}$ or other similar additives $49_O$ (see FIG. 27). The metallic foil 50 may be made of one or more of steel $50_S$, aluminum $50_A$, titanium $50_T$ and other formable metals $50_O$ (see FIG. 25), and may have a nominal starting thickness of 0.1 to 1.0 mm. This exterior layer 45 of metallic foil 50 serves to improve or provide electromagnetic compatibility ("EMC") and also protects against electromagnetic interference ("EMI"). Additionally, as viewed from above, the composite cover 20 may have four generally right-angled top corners 94, each of which may be either generally pointed (see FIG. 2) or generally rounded (see FIGS. 19 and 21).

Figures 17, 18:
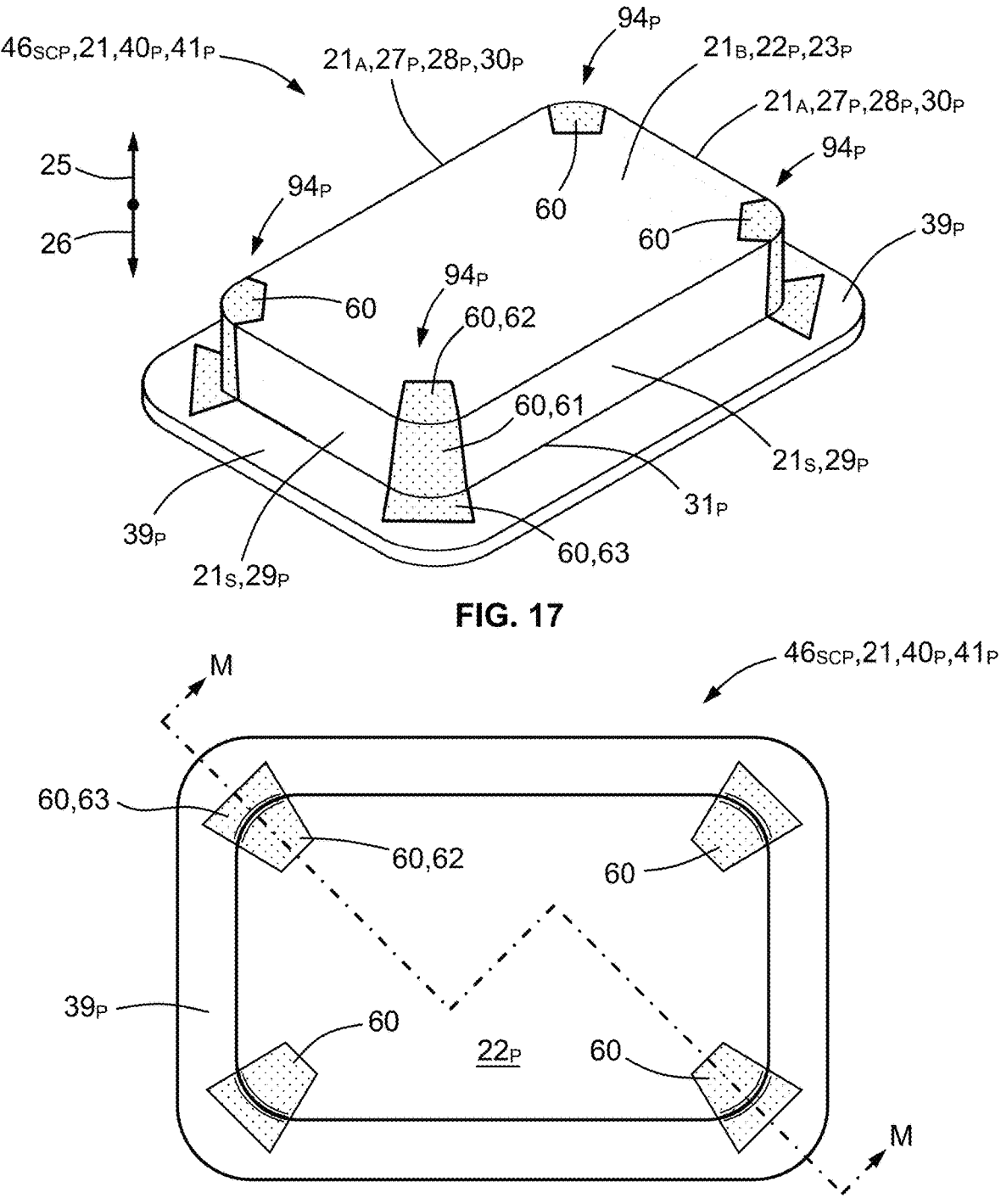
FIG. 17 is a schematic perspective view of a shaped composite preform according to a first embodiment.
FIG. 18 is a schematic plan view of the shaped composite preform of FIG. 17.

As described in more detail below, the abovementioned sandwich structure 42 may be created by providing a formed sheet $50_{FS}$ of metallic foil 50 and a composite preform 46 made of CFR 47 and resin 48. For example, as shown in FIGS. 8-10, the formed sheet $50_{FS}$ of metallic foil 50 may have a main foil portion $22_F$ having four main foil portion edges $27_F$ about a main foil perimeter $28_F$ of the main foil portion $22_F$, and four generally rectangular foil side portions $29_F$ each contiguous with and extending downward from a respective one of the main foil portion edges $27_F$. Each of the foil side portions $29_F$ may have respective first and second lateral foil edges $32_{F1}$, $32_{F2}$ extending generally downward and generally perpendicular to the main foil portion $22_F$. Each of the foil side portions $29_F$ may further have a respective interior and exterior preform surfaces $33_F$, $34_F$. In the first embodiment, each of the first and second lateral foil edges $32_{F1}$, $32_{F2}$ of each foil side portion $29_F$ is separated by a respective foil gap $95_F$ from a respective neighboring second or first lateral foil edge $32_{F2}$, $32_{F1}$ of a respective neighboring foil side portion $29_F$. Alternatively, in the second embodiment, the neighboring lateral foil edges $32_{F1}$, $32_{F2}$ may be unitary with each other with no foil gap $95_F$ provided therebetween. The composite preform 46 may be provided in the form of a folded composite preform $46_{FCP}$ as shown in FIG. 14, or as a shaped composite preform $46_{SCP}$ as shown in FIGS. 17-18, as will be described in further detail below.

Each of the side portions 29 of the composite cover 20 has a respective proximal long edge 30 and an opposing distal long edge 31 generally parallel to the proximal long edge 30. As indicated by FIG. 2, each proximal long edge 30 may coincide with a respective one of the main portion edges 27 and with a respective segment of the main portion perimeter 28. Each side portion 29 also has respective first and second lateral edges $32_1$, $32_2$ extending generally downward, and respective interior and exterior surfaces 33, 34. (Note that reference numeral 32 may be used generically to refer to either or both of the lateral edges $32_1$, $32_2$.)

Given the foregoing features which are common to both the first and second embodiments, attention will now be given to the differences between the first and second embodiments. In general, and as described in more detail below, the first embodiment includes a respective gap 95 at each of its four corners with top and bottom strengthening patches 60, 70 covering the gaps 95, while the second embodiment has no such gaps 95 or patches 60, 70 but instead has a plurality of elongated voids 98 formed at each of the four corners. The gaps 95 and elongated voids 98 are provided in the respective first and second embodiments in order to facilitate the manufacture of the composite cover 20, and to provide improved strength and/or flexibility for the corners of the composite cover 20.

In the first embodiment, each of the first and second lateral edges $32_1$, $32_2$ of each side portion 29 is separated by a respective gap 95 from a respective neighboring second or first lateral edge $32_2$, $32_1$ of a respective neighboring side portion 29. (For example, see the corner shown in FIGS. 2 and 4). In the first embodiment, the gap 95 in the overall composite cover 20 includes both a foil gap $95_F$ (i.e., a gap in the formed sheet $50_{FS}$ of metallic foil 50) and a preform gap $95_P$ (i.e., a gap formed in the composite preform 46). One way of providing this gap 95 between neighboring lateral edges $32_1$, $32_2$ is for each of the side portions 29 to be flared outward from the interior space 35 by a very small amount, such as by the small angle θ shown in FIGS. 3-4. (Likewise, and as shown in FIGS. 9-10 and 15-16, the respective side portions $29_F$, $29_P$ may be similarly flared outward to provide respective small angles $θ_F$, $θ_P$). Another way of providing the gap 95 is for the side portions 29 to have respective lengths along their long directions that are dimensioned so as to provide the gap 95 even when the side portions 29 are not flared slightly outward but are pointing directly downward, perpendicular to the generally plat surfaces 23, 24 of the main portion 22 (i.e., $θ=θ_F=θ_P=0$). This dimensioning of the side portions' lengths, so as to provide a gap 95, $95_F$, $95_P$ at each corner, may be accomplished by the slitting/cutting and assembly steps described below.

Figures 19, 20, 21:
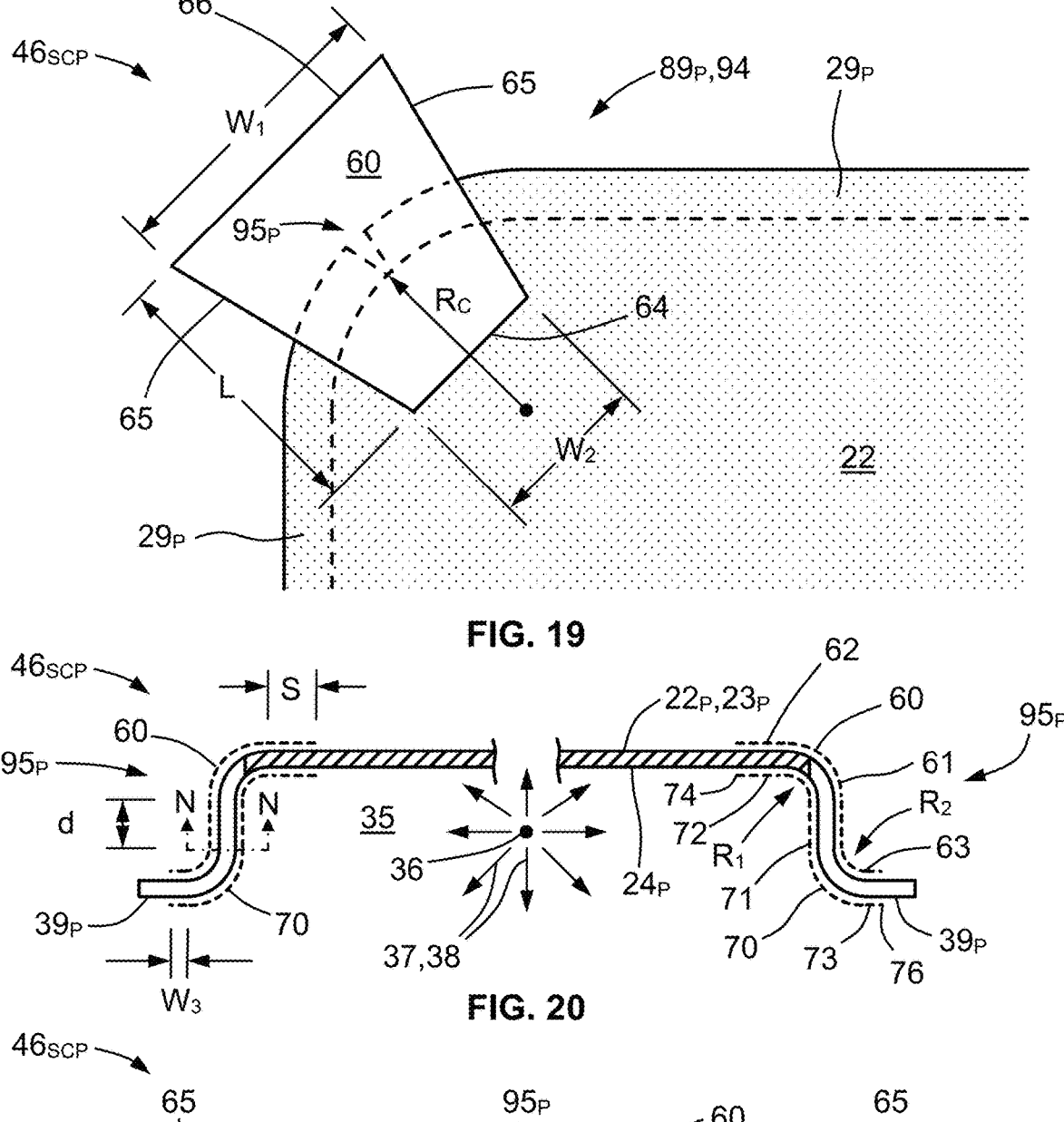
FIG. 19 is a schematic plan view of a top corner of a shaped composite preform according to the first embodiment, in which the top strengthening patch is being applied.
FIG. 20 is a schematic cross-sectional elevation view of the shaped composite preform of FIG. 17 along line M-M.
FIG. 21 is a schematic cross-sectional view of the shaped composite preform of FIG. 20 along line N-N.

According to the first embodiment, the composite cover 20 further includes one or more top and/or bottom strengthening patches 60, 70 (FIGS. 19-21). For example, four pairs of top and bottom patches 60, 70 may be used (i.e., one top patch 60 and one bottom patch 70 for each corner or gap), or four top patches 60 may be used (i.e., one top patch 60 for each corner or gap), or four bottom patches 70 may be used (i.e., one bottom patch 70 for each corner or gap), or some combination of top and/or bottom patches 60, 70 may be used (e.g., with some corners or gaps using both a top and a bottom patch 60, 70, and/or other corners or gaps using only a top patch 60, and/or other corners or gaps using only a bottom patch 70. The patches 60, 70 may be made of CFR 47 and resin 48, including the same CFR 47 and resin 48 used to form the composite preform 46. Each top strengthening patch 60 that is used is disposed or sandwiched between the interior layer 43 of CFR/resin 47, 48 and the exterior layer 45 of metallic foil 50, and is bonded to the interior and exterior layers 43, 45, with each top strengthening patch 60 covering a respective preform gap $95_P$. Each bottom strengthening patch 70 that is used is bonded onto an interior surface 33 of the interior layer 43 with each bottom patch 70 covering a respective preform gap $95_P$. Thus, each preform gap $95_P$ at each of the four corners of the composite preform 46 is covered by a top strengthening patch 60 above and/or by a bottom strengthening patch 70 below. (Alternatively, instead of there being a gap at each corner, the lateral edges of the neighboring side portions at each corner may be overlapped with each other. That is, each of the side portions has respective first and second lateral edges extending generally downward, such that each of the first and second lateral edges of each side portion overlaps with a respective neighboring second or first lateral edge of a respective neighboring side portion.)

As shown in FIG. 20, each of the top and bottom strengthening patches 60, 70 may have a side profile that has a general "S" shape, with a respective first portion 61, 71 which covers the respective gap 95$_P$ and overlaps onto the adjacent preform side portions 29$_P$, and a respective second portion 62, 72 which extends across the main preform portion 22$_P$. (To avoid confusion between the respective first and second portions 61, 62 of the top and bottom strengthening patches 60, 70, the "first portion" 71 of the bottom strengthening patch 70 may also be referred to as a "fourth portion" 71, and the "second portion" 72 of the bottom strengthening patch 70 may also be referred to as a "fifth portion" 72.) Thus, the first portion 61 of the top strengthening patch 60 overlaps onto the exterior surfaces 34P of the two neighboring preform side portions 29$_P$, and the second portion 62 of the top strengthening patch 60 extends onto the top surface 23$_P$ of the main preform portion 22$_P$. Also, the first (i.e., fourth) portion 71 of the bottom strengthening patch 70 overlaps onto the interior surfaces 33P of the two neighboring preform side portions 29$_P$, and the second (i.e., fifth) portion 72 of the bottom strengthening patch 70 extends onto the bottom surface 24$_P$ of the main preform portion 22$_P$. If the composite cover 20 or preform 46 includes an optional flange 39$_P$ as shown in FIG. 20, then an optional third portion 63 of the top strengthening patch 60 may extend onto a top surface of the flange 39$_P$, and an optional sixth portion 73 of the bottom strengthening patch 70 may extend onto a bottom surface of the flange 39$_P$.

FIG. 19 shows a schematic plan view of a top corner 94 of a shaped composite preform 46$_{SCP}$ according to the first embodiment, in which the top corner 94 has a corner radius of R$_C$ and the top strengthening patch 60 is in the process of being applied. (Note that while only the top strengthening patch 60 is visible in this view, and not the bottom strengthening patch 70, the descriptions here of the top strengthening patch 60 may likewise apply to the bottom strengthening patch 70). Each of the strengthening patches 60, 70 may be generally trapezoidal in shape as viewed from above, in order to facilitate draping each patch 60, 70 over the preform gap 95$_P$ as desired, such as in the abovementioned general "S" shape. As shown in FIG. 20, each "S" shape has a vertical middle part that has a length of d, a top horizontal part with a length of S, a bottom horizontal part with a length of W$_3$, a top curved part with a radius of R$_1$ and a length of π*R$_1$/2, and a bottom curved part with a radius of R$_2$ and a length of π*R$_2$/2. Thus, the length L of each patch 60, 70 is a sum of the these lengths; i.e., L=S+d+W$_3$+π*R$_1$/2+π*R$_2$/2. Each trapezoidal patch 60, 70 also has a respective first width W$_1$ along a bottom edge 66, 76, a respective narrower second width W$_2$ along a top edge 64, 74, and a respective thickness t. Lateral edges 65, 75 join the top and bottom edges 64, 74, 66, 76. In general, the top horizontal length S may be 25 to 50 mm, the second width may be W$_2$=Z*t (where Z is 32 for carbon fiber and 20 for glass fiber) or SQRT(2*R$_C$), whichever is greater, and the first width W$_1$ may be sized to fall between 1.25 and 1.50 times the second width W$_2$.

As shown in FIGS. 2 and 4, the composite cover 20 may have four corner junctures 89. Similarly, as shown in FIGS.

8 and 10, the formed sheet 50$_{FS}$ may have four foil corner junctures 89$_F$, and as shown in FIGS. 14 and 16, the formed composite preform 46$_{FCP}$ may have four preform corner junctures 89$_P$. As used herein, a "corner juncture" 89, 89$_F$, 89$_P$ is a point where the main portion 22, 22$_F$, 22$_P$ and two neighboring side portions 29, 29$_F$, 29$_P$ meet together, and includes a predetermined part of the main portion 22, 22$_F$, 22$_P$ and the two neighboring side portions 29, 29$_F$, 29$_P$ immediately around this point. Thus, a "corner juncture" 89, 89$_F$, 89$_P$ defines a three-dimensional ("3D") part or "chunk" of the composite cover 20, formed sheet 50$_{FS}$ or formed composite cover 46$_{FCP}$ (as the case may be) which has length, width, height and volume (i.e., a corner juncture volume 90, 90$_F$, 90$_P$). As such, each corner juncture 89, 89$_F$, 89$_P$ and corner juncture volume 90, 90$_F$, 90$_P$ contains a respective first segment 91, 91$_F$, 91$_P$ of the main portion 22, 22$_F$, 22$_P$, a respective second segment 92, 92$_F$, 92$_P$ of an adjacent one of the side portions 29, 29$_F$, 29$_P$, and a respective third segment 93, 93$_F$, 93$_P$ of another adjacent one of the side portions 29, 29$_F$, 29$_P$. Also, a "corner juncture" 89, 89$_F$, 89$_P$ may be contrasted with a "top corner" 94, 94$_F$, 94$_P$, which, as used herein, is a point where two main portion edges 27, 27$_F$, 27$_P$ meet together on a top surface 23, 23$_F$, 23$_P$ of the composite cover 20, formed sheet 50$_{FS}$ or formed composite preform 46$_{FCP}$ (as the case may be), and includes a predetermined part of the main portion's top surface 23, 23$_F$, 23$_P$ immediately around this point; thus, a "top corner" 94, 94$_F$, 94$_P$ defines a two-dimensional ("2D") part of the composite cover 20, formed sheet 50$_{FS}$ or formed composite preform 46$_{FCP}$ which has length, width and area (but not height and volume). Note that the foregoing description in this paragraph likewise applies to the respective pertinent morphs of the formed sheet 50$_{FS}$ and of the formed composite preform 46$_{FCP}$, including the shaped composite preform 46$_{SCP}$, the cured shaped composite preform 46$_{CSCP}$ and the composite preform 46.

(It may be noted that given the sandwich structure 42 of the composite cover 20 described earlier, each corner structure 89 and corner structure volume 90 of the composite cover 20 will contain a respective "chunk" of the metallic foil 50 of the formed sheet 50$_{FS}$ and of the CFR/resin 47, 48 of the composite preform 46.)

Figure 22:
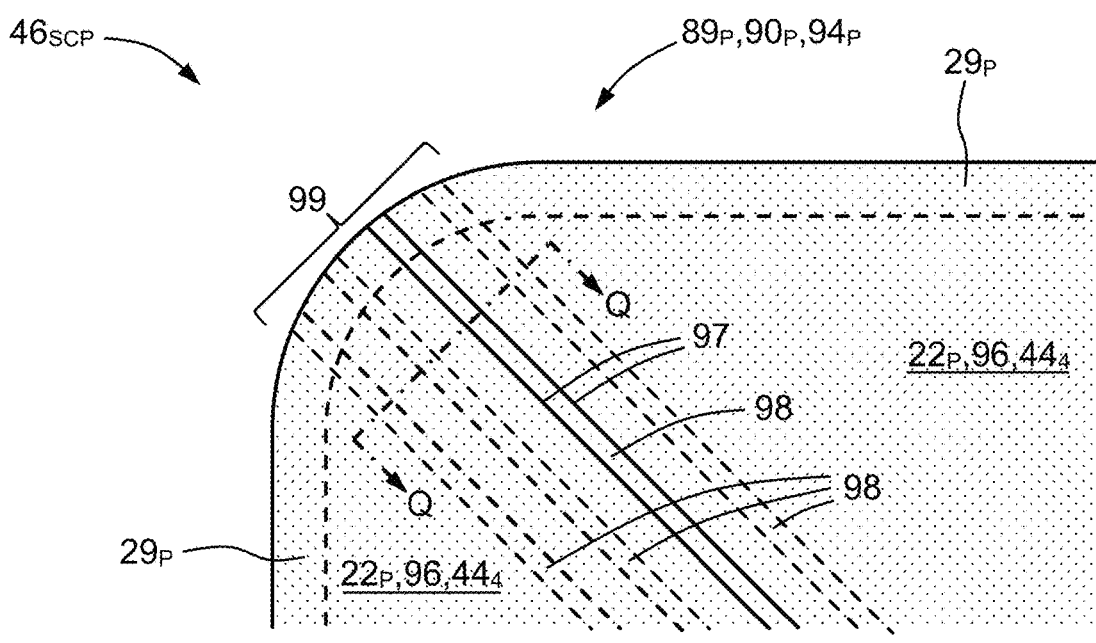
FIG. 22 is a schematic plan view of a top corner of a shaped composite preform according to a second embodiment.
Figure 23:
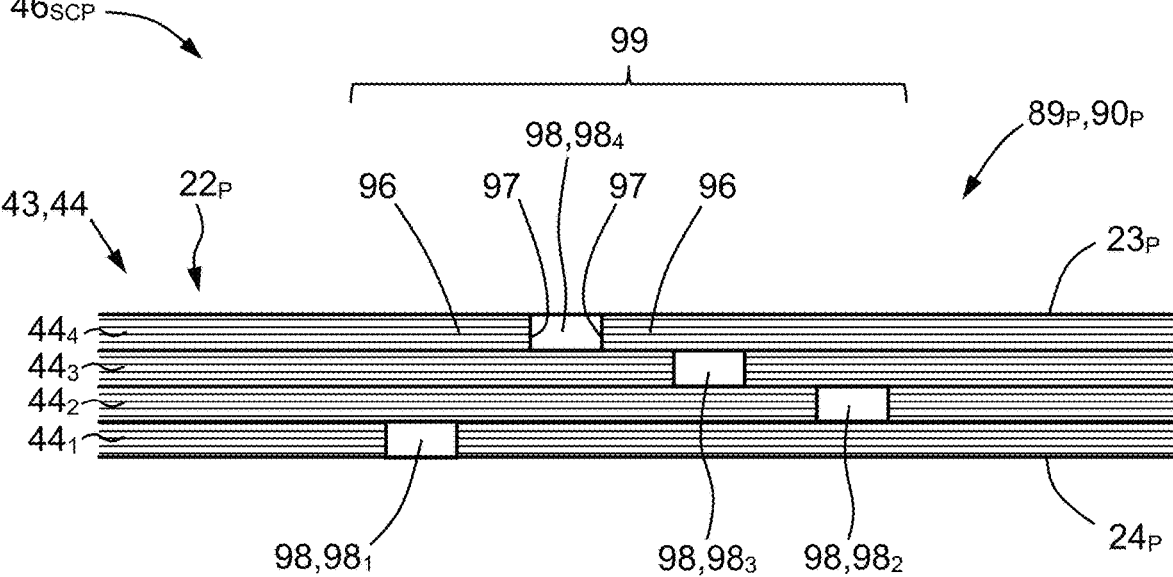
FIG. 23 is a schematic cross-sectional elevation view of the shaped composite preform of FIG. 22 along line Q-Q.

Turning now to the second embodiment, FIG. 22 shows a schematic plan view of a top corner 94$_P$ of a shaped composite preform 46$_{SCP}$ according to the second embodiment, and FIG. 23 shows a schematic cross-sectional elevation view along line Q-Q of FIG. 22, revealing the internal structure of the corner juncture 89$_P$/corner volume 90$_P$ thereat. In this embodiment, the interior layer 43 may be made of a plurality of individual layers 44 of the CFR 47 and resin 48. (See the layers 44$_1$, 44$_2$, 44$_3$ and 44$_4$ of FIG. 23. Note that additional layers may be added above the top layer 44$_4$ and below the bottom layer 44$_1$.) Each individual layer 44 includes two or more respective sheets 96 of CFR 47 disposed in-plane with each other (i.e., within the same individual layer 44), with each of the two or more respective sheets 96 of each individual layer 44 separated from one or more neighboring others of the two or more respective sheets 96 by one or more respective elongated voids 98 (e.g., 98$_1$, 98$_2$, 98$_3$, 98$_4$). A respective group 99 of the elongated voids 98 may be located within each corner juncture 89$_P$/corner juncture volume 90$_P$ of the shaped composite preform 46$_{SCP}$, such that the elongated voids 98 of each respective group 99 run generally parallel to each other and are staggered and non-overlapping with respect to each other. As used herein, "non-overlapping" means that no elongated void 98 is located directly above another elongated void 98 (at least for a given number of layers 44, such as the four individual layers 44 shown in FIG. 23).

As noted above, the second embodiment does not have a gap 95, 95$_P$ at each corner like the first embodiment has; instead, the second embodiment includes a plurality of elongated voids 98. One difference between the preform gaps 95$_P$ of the first embodiment and the elongated voids 98 of the second embodiment is that each of the preform gaps 95$_P$ extends all the way through the thickness of the preform 46 (which may comprise multiple layers of CFR 47 and resin 48), whereas each elongated void 98 only extends through a portion of the preforms thickness (i.e., through a single individual layer 44). In either embodiment, the gap 95, 95$_P$ or elongated void 98 may optionally be filled with resin 48 and/or other fillers.

Each of the elongated voids 98 located within each respective corner juncture 89$_P$/corner juncture volume 90$_P$ may extend through the respective first segment 91$_P$ of the respective corner juncture 89$_P$/corner juncture volume 90$_P$—i.e., through the main preform portion 22$_P$—and also through either (but not both) of the respective second and third segments 92$_P$, 93$_P$ of the respective corner juncture 89$_P$/corner juncture volume 90$_P$—i.e., through one or the other of the two neighboring preform side portions 29$_P$. As illustrated in FIGS. 22-23, each elongated void 98 is defined and bounded by the respective sheet edges 97 of two neighboring sheets 96 within the individual layer 44 within which each respective elongated void 98 is disposed. Elongated voids 98 may optionally be disposed at other locations within the shaped composite preform 46$_{SCP}$ besides the four corners junctures 89$_P$/corner juncture volumes 90$_P$, if desired.

The group 99 of elongated voids 98 serves to provide additional mechanical flexibility to the corners of the shaped composite preform 46$_{SCP}$, so that is can more easily be fit onto a male mold 196 or mandrel or into a female mold 198, such as for curing the uncured resin within the preform 46$_{SCP}$. The elongated voids 98 may optionally also extend into a flange portion 39$_P$ of the preform 46$_{SCP}$, if desired.

According to another embodiment, a composite battery cover 20 includes a generally rectangular main portion 22 having four main portion edges 27 about a perimeter 28 of the main portion 22 and having opposing top and bottom surfaces 23, 24 defining respective upward and downward directions 25, 26, and four generally rectangular side portions 29 each contiguous with and extending downward from a respective one of the main portion edges 27.

The main portion 22 and the four side portions 29 generally enclose an interior space 35 and are made of a sandwich structure 42 comprising an interior layer 43 of CFR 47 and resin 48 and an exterior layer 45 of metallic foil 50 bonded to the interior layer 43. The CFR 47 include at least one of carbon fiber 47$_{CF}$, fiberglass 47$_{FG}$, aramid 47$_A$ and polyamide 47$_{PA}$, and have an average nominal fiber length of at least 500 mm and a stiffness of at least 40 GPa. The resin 48 includes an epoxy resin 48$_{ER}$ with additives 49 mixed therein, or a phenolic resin 48$_{PR}$, wherein the additives 49 include at least one of aluminum trihydrate 49$_{ATA}$, aluminum trihydroxide 49$_{ATH}$, ammonium polyphosphate 49$_{APP}$ and expandable graphite 49$_{EG}$. The metallic foil 50 is made of at least one of steel 50$_S$, aluminum 50$_A$ and titanium 50$_T$ and has a thickness of 0.1 to 1.0 mm. Additionally, the composite cover 20, as viewed from above, has four generally right-angled top corners 94, each of which is either generally pointed or generally rounded.

Figure 24:
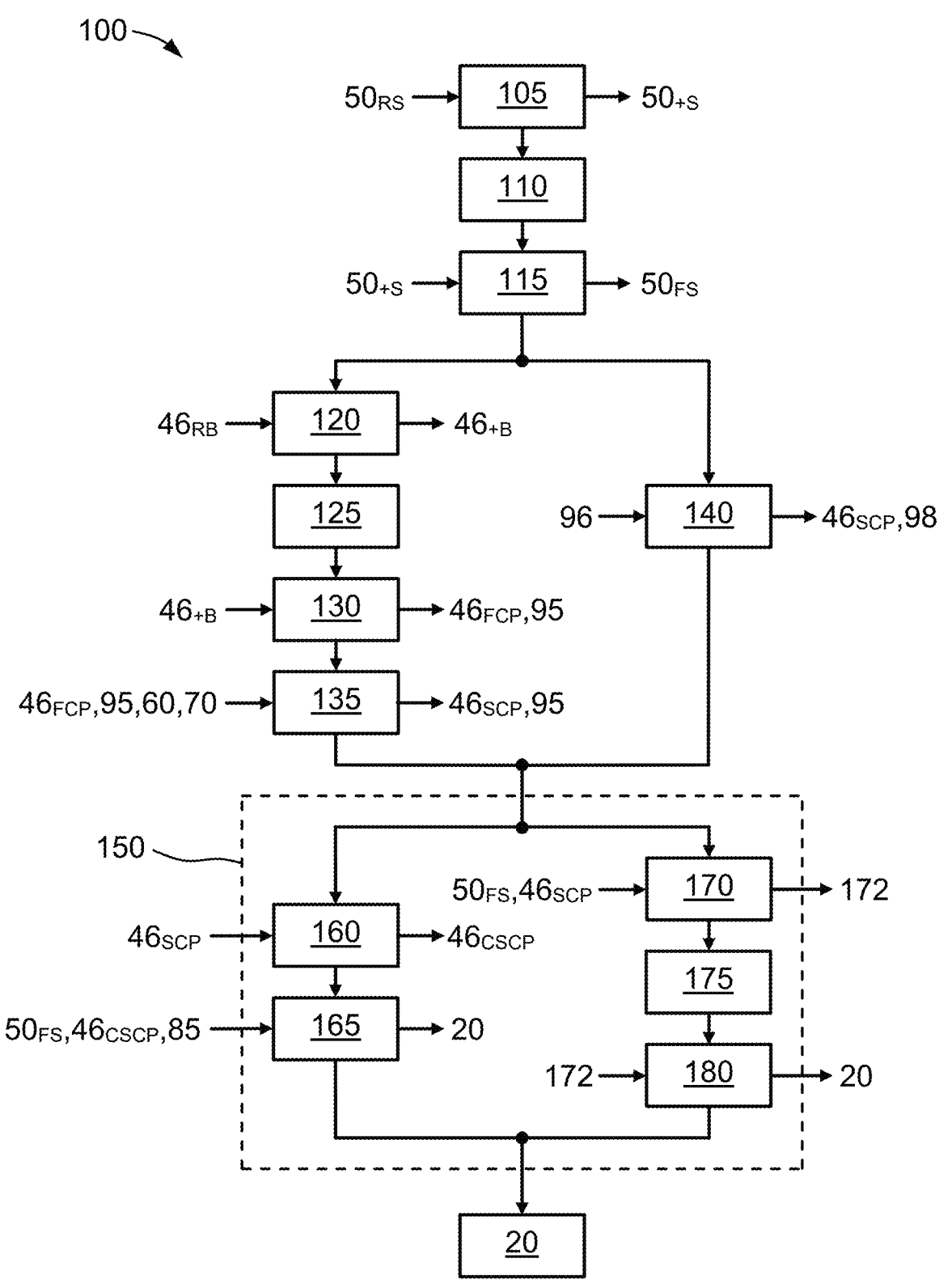
FIG. 24 is a flowchart for a method of manufacturing a composite cover.

Turning now to the third and fourth embodiments, each of which relates to a method 100 of manufacturing the composite cover 20, FIG. 24 shows a flowchart of the steps involved in these embodiments. The process order of the flowchart flows from top to bottom, with the reference numerals for certain inputs and outputs shown to the left and right, respectively, of the blocks for some of the process steps. For example, at block 105, which is a step of cutting slits 52$_F$ in the metallic foil 50 (as described in more detail below), the "50$_{RS}$" to the left of the block represents a generally rectangular sheet of metallic foil 50 as an input for the step, and the "50$_{+S}$" to the right of the block represents a generally plus-sign-shaped sheet of metallic foil 50 as out output of the step.

In this method 100, the composite cover 20 has a desired shape 21 generally of a five-walled open box, as described above. The method 100 generally includes, at block 150 (represented by the dashed rectangle), the step of attaching a formed sheet 50$_{FS}$ made of metallic foil 50 and having the desired shape 21 onto a shaped composite preform 46$_{SCP}$ that is disposed in the desired shape 21, wherein the shaped composite preform 46$_{SCP}$ is made of CFR 47 and resin 48. However, in order to understand how the formed sheet 50$_{FS}$ and the shaped composite preform 46$_{SCP}$ are produced (so they may serve as inputs for block 150), the steps in the flowchart before block 150 will now be explained.

Figures 5, 6:
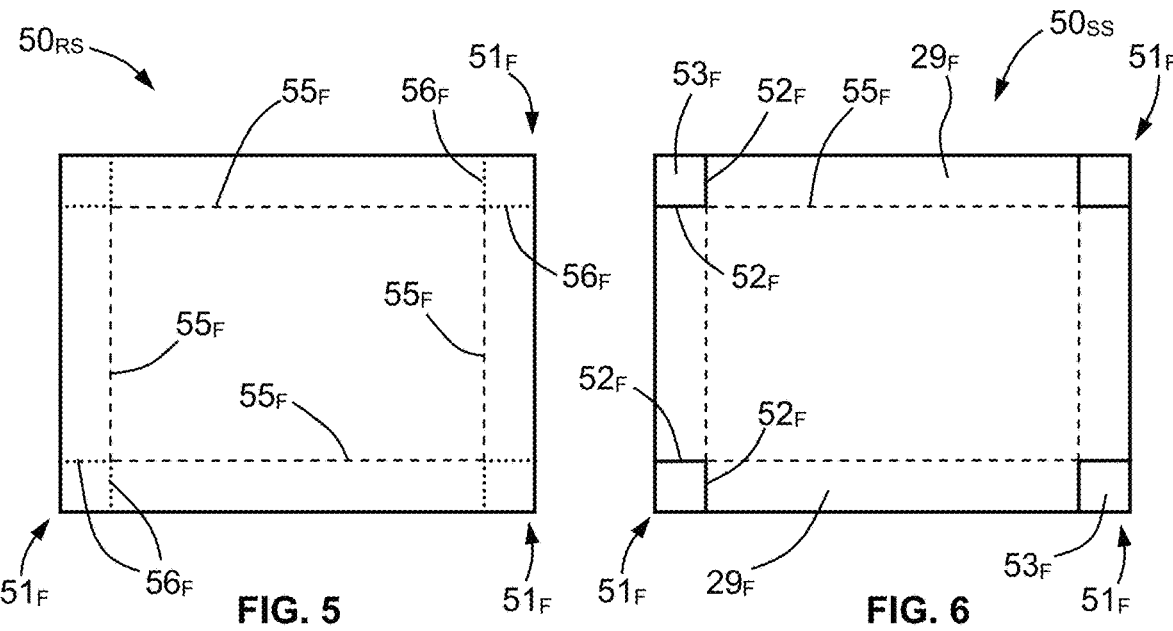
FIG. 5 is a schematic plan view of a rectangular sheet of metallic foil.
FIG. 6 is a schematic plan view of the rectangular sheet of FIG. 5 after being slitted to form a slitted sheet of metallic foil.

Prior to the steps shown in the flowchart, a generally rectangular sheet 50$_{RS}$ of metallic foil 50 is provided, as shown in FIG. 5. The generally rectangular sheet 50$_{RS}$ has four corners 51$_F$, a plurality of fold lines 55F (shown as dashed line segments) denoting where the sheet 50$_{RS}$ will eventually be folded, and a plurality of slit lines 56$_F$ (shown as dotted line segments) denoting where the sheet 50$_{RS}$ will be slit, sliced or cut.

Figure 7:
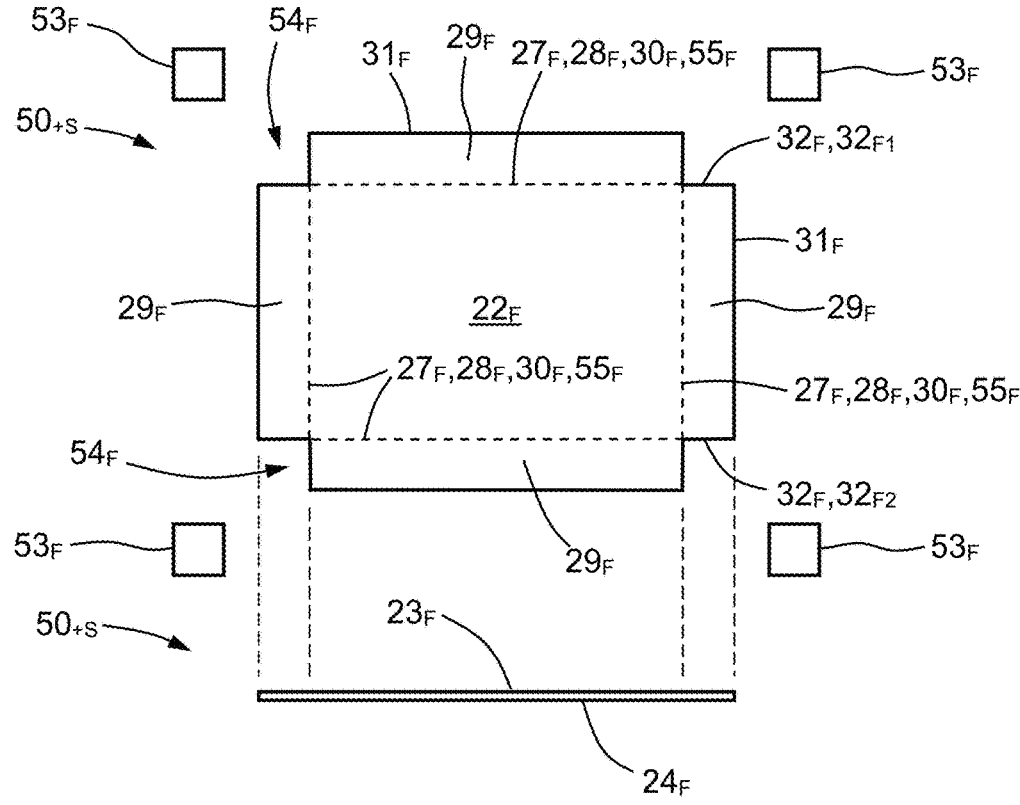
FIG. 7 are schematic plan and elevation views of the slitted sheet of FIG. 6 after removal of the slitted corner sections to form a plus-sign-shaped sheet of metallic foil.

Next, FIG. 6 shows where slits 52$_F$ are cut in the generally rectangular sheet 50$_{RS}$, thereby producing a generally rectangular slitted sheet 50$_{SS}$. Note that whereas the slit lines 56$_F$ were shown as dotted line segments in FIG. 5, in FIG. 6 the slits 52$_F$ are shown as solid line segments. The slit lines 56$_F$ and slits 52$_F$ are arranged so as to define and cut out a generally rectangular section 53$_F$ at each former corner 51$_F$. The generally rectangular sections 53$_F$ may be generally square, and when they are removed from the slitted sheet 50$_{SS}$, they leave generally rectangular or generally square cutouts 54$_F$ at the former corners 51$_F$ as shown in FIG. 7, thereby producing a generally plus-sign-shaped sheet 50$_{+S}$ of metallic foil 50.

As noted above, at block 105 of FIG. 24, slits 52$_F$ are cut in a generally rectangular sheet 50$_{RS}$ so as to remove a generally rectangular-shaped first section 53$_F$ of the generally rectangular sheet 50$_{RS}$ from each of the four first corners 51$_F$ to produce the generally plus-sign-shaped sheet 50$_{+S}$. At block 110, the generally plus-sign-shaped sheet 50$_{+S}$ is provided, wherein the sheet 50$_{+S}$ is configured to be disposed in the desired shape 21. As shown in FIG. 7, the plus-sign-shaped sheet 50$_{+S}$ has a generally rectangular main foil portion 22$_F$ having four main foil portion edges 27$_F$ about a main foil perimeter 28$_F$ of the main foil portion 22$_F$, and four generally rectangular foil side portions 29$_F$ each having a respective proximal foil long edge 30$_F$ contiguous with a respective one of the main foil portion edges 27$_F$. The main foil portion 22$_F$ also has a top foil surface 23$_F$ and a bottom foil surface 24$_F$. Each foil side portion 29$_F$ also has a respective distal foil long edge 31$_F$, which is opposed to and generally parallel with the respective proximal foil long edge 30$_F$, and also two opposed lateral foil edges 32$_F$. Note that the main foil portion edges 27$_F$, the main foil portion perimeter 28$_F$ and the proximal foil long edges 30$_F$ may coincide with each other and with the fold lines 55F. Then, at block 115, each of the foil side portions 29$_F$ of the generally plus-sign-shaped sheet 50$_{+S}$ is bent downward along its respective proximal foil long edge 30$_F$ (i.e., along its respective fold line 55F) to produce the formed sheet 50$_{FS}$, which is shown in FIG. 8.

As noted earlier, the structure of the composite cover 20 may be produced as either a first embodiment or as a second embodiment. In the first embodiment, each of the four corners of the composite preform 46 has a respective gap 95 formed in it, which is covered by top and bottom strengthening patches 60, 70. In the second embodiment, each of the four corners of the composite preform 46 has a respective group 99 of staggered, non-overlapping elongated voids 98 (but without any top and bottom strengthening patches 60, 70). In FIG. 24, blocks 120-135 address the first embodiment, while block 140 addresses the second embodiment.

The method 100 of making the composite preform 46 of the first embodiment is somewhat similar to the method of making the generally plus-sign-shaped sheet 50$_{+S}$ of metallic foil 50 described above. For example, a generally rectangular blank 46$_{RB}$ of CFR 47 (optionally impregnated with resin 48) is provided, as shown in FIG. 11. The generally rectangular blank 46$_{RB}$ has four corners 51P, a plurality of fold lines 55P (shown as dashed line segments) denoting where the blank 46R will eventually be folded, and a plurality of cut lines 56P (shown as dotted line segments) denoting where the blank 46$_{RB}$ will be slit, sliced or cut.

Next, FIG. 12 shows where cuts 52P are made in the generally rectangular blank 46$_{RB}$, thereby producing a generally rectangular cut blank 46$_{CB}$. Note that whereas the cut lines 56P were shown as dotted line segments in FIG. 11, in FIG. 12 the cuts 52P are shown as solid line segments. The cut lines 56P and cuts 52P are arranged so as to define and cut out a generally rectangular section 53P at each former corner 51P. The generally rectangular sections 53P may be generally square, and when they are removed from the cut blank 46$_{CB}$, they leave generally rectangular or generally square cutouts 54P at the former corners 51P as shown in FIG. 13, thereby producing a generally plus-sign-shaped blank 46$_{+B}$ of CFR/resin 47, 48.

At block 120 of FIG. 24, cuts 52P are made in a generally rectangular blank 46$_{RB}$ made of CFR/resin 47, 48 and having four second corners 51P, so as to remove a generally rectangular-shaped second section 53P of the generally rectangular blank 46R from each of the four second corners 51P to produce the generally plus-sign-shaped blank 46$_{+B}$. At block 125, the generally plus-sign-shaped blank 46$_{+B}$ is presented, wherein the blank 46$_{+B}$ is configured to be disposed in the desired shape 21. As shown in FIG. 13, the generally plus-sign-shaped blank 46$_{+B}$ has a generally rectangular main preform portion 22$_P$ having four main preform portion edges 27$_P$ about a main preform perimeter 28$_P$ of the main preform portion 22$_P$, and four generally rectangular preform side portions 29$_P$ each having a respective proximal preform long edge 30$_P$ contiguous with a respective one of the main preform portion edges 27$_P$. The main preform portion 22$_P$ also has a top preform surface 23$_P$ and a bottom preform surface 24$_P$. Each preform side portion 29$_P$ also has a respective distal preform long edge 31$_P$, which is opposed to and generally parallel with the respective proximal preform long edge 30$_P$, and also two opposed lateral preform edges 32$_P$. Note that the main preform portion edges 27$_P$, the main preform portion perimeter 28$_P$ and the proximal preform long edges 30$_P$ may coincide with each other and with the fold lines 55P. Then, at block 130, each of the preform side portions 29$_P$ is folded downward along its respective proximal preform long edge 30$_P$ (i.e., along its respective fold line 55P) to produce a folded composite preform 46$_{FCP}$, as shown in FIG. 14.

Each of the preform side portions 29$_P$ has respective first and second lateral preform edges 32$_{P1}$, 32$_{P2}$ extending downward and away from the main preform portion 22$_P$, such that each of the first and second lateral preform edges 32$_{P1}$, 32$_{P2}$ of each preform side portion 29$_P$ is separated by a respective gap 95$_P$ from a respective neighboring second or first lateral preform edge 32$_{P2}$, 32$_{P1}$ of a respective neighboring preform side portion 29$_P$.

At block 135, each respective gap 95$_P$ is covered with a top strengthening patch 60 placed on a top surface 23$_P$ of the folded composite preform 46$_{FCP}$ and/or with a bottom strengthening patch 70 on a bottom surface 24$_P$ of the folded composite preform 46$_{FCP}$, thereby producing the shaped composite preform 46$_{SCP}$, as shown in FIGS. 17-21. Each pair of top and bottom strengthening patches 60, 70 may be secured in place over the pair's respective preform gap 95$_P$ by an adhesive or by resin 48. Alternatively or additionally, at block 135, each first lateral preform edge 32$_{P1}$ may be overlapped with the respective neighboring second lateral preform edge 32$_{P2}$, thereby producing the shaped composite preform 46$_{SCP}$. That is, at each corner, a gap 95$_P$ or an arrangement of overlapping lateral edges 32$_{P1}$, 32$_{P2}$ may be provided, and a top patch 60 and/or a bottom patch 70 may be applied to each corner to cover the gap 95$_P$ or overlapping lateral edges 32$_{P1}$, 32$_{P2}$ thereat.

Turning now to the manufacture of the second embodiment, at block 140, the shaped composite preform 46$_{SCP}$ is formed in the desired shape 21. For example, the shaped composite preform 46$_{SCP}$ may be fabricated by using a tailored fiber placement ("TFP") process, which is capable of producing very finely detailed 3D shapes made of filaments, such as CFR 47. Alternatively, the shaped composite preform 46$_{SCP}$ may be produced manually, such as by using a sheet lay-up process, or it may be produced in an automated fashion using known 3D printing techniques.

In this second embodiment, the shaped composite preform 46$_{SCP}$ has a generally rectangular main preform portion 22$_P$ having four main preform portion edges 27$_P$ about a main preform perimeter 28$_P$ of the main preform portion 22$_P$, and four generally rectangular preform side portions 29$_P$ each having a respective proximal preform long edge 30$_P$ contiguous with a respective one of the main preform portion edges 27$_P$. The shaped composite preform 46$_{SCP}$ may have four preform corner junctures 89$_P$, with each preform corner juncture 89$_P$ having a respective preform corner juncture volume 90$_P$ thereabout, and with each preform corner juncture 89$_P$/preform corner juncture volume 90$_P$ comprising a respective first preform segment 91$_P$ of the main preform portion 22$_P$, a respective second preform segment 92$_P$ of an adjacent one of the preform side portions 29$_P$, and a respective third preform segment 93$_P$ of another adjacent one of the preform side portions 29$_P$.

The shaped composite preform 46$_{SCP}$ may be made of a plurality of individual layers 44 of the CFR 47 and resin 48, wherein each individual layer 44 includes two or more respective sheets 96 of the CFR 47 disposed in-plane with each other, with each of the two or more respective sheets 96 of each individual layer 44 separated from one or more neighboring others of the two or more respective sheets 96 by one or more respective elongated voids 98, wherein a respective group 99 of the elongated voids 98 is located within each preform corner juncture 89$_P$/preform corner juncture volume 90$_P$ such that the elongated voids 98 of each respective group 99 run generally parallel to each other and are non-overlapping with respect to each other.

Turning now to the abovementioned third embodiment, the attaching step at block 150 may include, at block 160, curing the shaped composite preform $46_{SCP}$ in the desired shape 21 to produce a cured shaped composite preform $46_{CSCP}$, and, at block 165, bonding the formed sheet $50_{FS}$ of metallic foil 50 onto the cured shaped composite preform $46_{CSCP}$ with an adhesive 85 to form the composite cover 20. Alternatively, according to the abovementioned fourth embodiment, the attaching step at block 150 may include: at block 170, fitting the formed sheet $50_{FS}$ onto the shaped composite preform $46_{SCP}$ to produce a sheet-preform assembly 172 having the desired shape 21; at block 175, placing the sheet-preform assembly 172 into a mold (i.e., onto a male mold 196 and/or into a female mold 198); and, at block 180, curing the sheet-preform assembly 172 in the mold 196, 198 to produce the composite cover 20. At the completion of either of the third and fourth embodiments, the formed sheet $50_{FS}$ of metallic foil 50 will have been attached to the shaped composite preform $46_{SCP}$—thus providing the sandwich structure 42 of an interior layer 43 of CFR 47 and resin 48 and an exterior layer 45 of metallic foil 50—and the composite cover 20 will have been completed.

In the first and second embodiments, the formed sheet $50_{FS}$, the composite preform 46 and the composite cover 20 (including some or all of their respective morphs) each have a respective shape $40_F$, $40_P$, 40 and a respective size $41_F$, $41_P$, 41. (As used here, "shape" refers to the overall geometric shape of an object, including the shapes of and spatial orientations among the individual elements that make up the object, while "size" refers to how large or small the object and its individual elements are.) In general, the respective shapes $40_F$, $40_P$, 40 of the formed sheet $50_{FS}$, the composite preform 46 and the composite cover 20 (including their respective morphs) may be substantially the same as each other, and their respective sizes $41_F$, $41_P$, 41 may likewise be substantially the same as each other. However, because the formed sheet $50_{FS}$ is stacked upon the composite preform 46, and because the composite cover 20 is essentially equivalent to this stack-up, the respective thicknesses of the formed sheet $50_{FS}$, the composite preform 46 and the composite cover 20 may obviously vary from one another.

In the third and fourth embodiments, the step of curing the shaped composite preform $46_{SCP}$ at block 160, and the step of curing the sheet-preform assembly 172 at block 180, each involve curing the resin 48 that is in the shaped composite preform $46_{SCP}$ or the sheet-preform assembly 172, and each of these steps may be performed by compression molding 190 or resin transfer molding 192 (see FIG. 28). And in the fourth embodiment, the fitting and placing steps of blocks 170 and 175, respectively, may be performed together (i.e., simultaneously) by co-molding the formed sheet $50_{FS}$ of metallic foil 50 with the shaped composite preform $46_{SCP}$. Further, it may be noted that when the structure of the first embodiment is used with the method 100 of the fourth embodiment, resin 48 in or on the top strengthening patches 60 may bond the corners of the formed sheet $50_{FS}$ (which have foil gaps $95_F$ thereat) to the top strengthening patches 60 which cover the corners of the composite preform 46 (and the preform gaps $95_P$ thereat).

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding the plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function (s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A composite cover, comprising:

a generally rectangular main portion having four main portion edges about a perimeter of the main portion and having opposing top and bottom surfaces defining respective upward and downward directions; and four generally rectangular side portions each contiguous with and extending downward from a respective one of the main portion edges;

wherein the main portion and the four side portions generally enclose an interior space and are made of a sandwich structure comprising an interior layer of continuous fiber reinforcements and resin and an exterior layer of metallic foil bonded to the interior layer;

wherein adjacent lateral edges of neighboring ones of the side portions are separated by and define a gap;

a top strengthening patch disposed between and bonded to the interior layer and the exterior layer and covering the gap, the top strengthening patch overlaying an exterior surface of the interior layer of each of the neighboring side portions that define the gap; and a bottom strengthening patch bonded to an interior surface of the interior layer of each of the neighboring side portions that define the gap and covering the gap.

2. The composite cover of claim 1, wherein the continuous fiber reinforcements include at least one of carbon fiber, fiberglass, aramid and polyamide and have an average nominal fiber length of at least 500 mm and a stiffness of at least 40 GPa.

3. The composite cover of claim 1, wherein the resin includes an epoxy resin with additives mixed therein or a phenolic resin, wherein the additives include at least one of aluminum trihydrate, aluminum trihydroxide, ammonium polyphosphate and expandable graphite.

4. The composite cover of claim 1, wherein the metallic foil is made of at least one of steel, aluminum and titanium and has a thickness of 0.1 to 1.0 mm.

5. The composite cover of claim 1, wherein each of the top and bottom strengthening patches includes a respective first portion which covers the respective gap and a respective second portion which extends across the main portion.

6. The composite cover of claim 1, wherein the composite cover has four corner junctures, with each corner juncture having a respective corner juncture volume thereabout, and with each corner juncture volume comprising a respective first segment of the main portion, a respective second segment of an adjacent one of the side portions, and a respective third segment of another adjacent one of the side portions; and wherein the interior layer is made of a plurality of individual layers of the continuous fiber reinforcements and resin, wherein each individual layer includes two or more respective sheets of the continuous fiber reinforcements disposed in-plane with each other, with each of the two or more respective sheets of each individual layer has an edge separated from a neighboring edge of a neighboring one or more neighboring others of the two or more respective sheets such that the edge and the neighboring edge define an by one or more respective elongated void, the plurality of individual layers thus including a plurality of elongated voids, wherein a respective group of the elongated voids of the plurality of individual layers is located within each corner juncture volume such that the elongated voids of each respective group run generally parallel to each other and are staggered and non-overlapping with respect to each other.

7. The composite cover of claim 6, wherein each of the elongated voids located within each respective corner juncture volume extends through the respective first segment of the respective corner juncture volume, and through either of the respective second and third segments of the respective corner juncture volume.

8. The composite cover of claim 6, wherein the metallic foil has a main foil portion having four main foil portion edges about a main foil perimeter of the main foil portion, and four generally rectangular foil side portions each contiguous with and extending downward from a respective one of the main foil portion edges, wherein each of the foil side portions has respective first and second lateral foil edges extending generally downward, such that each of the first and second lateral foil edges of each foil side portion is separated by a respective foil gap from a respective neighboring second or first lateral foil edge of a respective neighboring foil side portion.

9. A composite battery cover, comprising:

a generally rectangular main portion having four main portion edges about a perimeter of the main portion and having opposing top and bottom surfaces defining respective upward and downward directions; and four generally rectangular side portions each contiguous with and extending downward from a respective one of the main portion edges;

wherein the main portion and the four side portions generally enclose an interior space and are made of a sandwich structure comprising an interior layer of continuous fiber reinforcements and resin and an exterior layer of metallic foil bonded to the interior layer;

wherein the continuous fiber reinforcements include at least one of carbon fiber, fiberglass, aramid and polyamide and have an average nominal fiber length of at least 500 mm and a stiffness of at least 40 GPa, the resin includes an epoxy resin with additives mixed therein or a phenolic resin wherein the additives include at least one of aluminum trihydrate, aluminum trihydroxide, ammonium polyphosphate and expandable graphite, and the metallic foil is made of at least one of steel, aluminum and titanium and has a thickness of 0.1 to 1.0 mm; and wherein the composite cover, as viewed from above, has four generally right-angled top corners, each of which is either generally pointed or generally rounded wherein the composite cover has four corner junctures, with each corner juncture having a respective corner juncture volume thereabout, and with each corner juncture volume comprising a respective first segment of the main portion, a respective second segment of an adjacent one of the side portions, and a respective third segment of another adjacent one of the side portions; and wherein the interior layer defines elongated voids and is made of a plurality of individual layers of the continuous fiber reinforcements and resin, wherein each individual layer includes two or more sheets of the continuous fiber reinforcements disposed in-plane with each other, each of the two or more sheets of each individual layer has an edge separated from a neighboring edge of a neighboring one of the two or more sheets such that the edge and the neighboring edge define a respective one of the elongated voids, wherein a respective group of the elongated voids is located within each corner juncture volume such that the elongated voids of each respective group run generally parallel to each other and are staggered and non-overlapping with respect to each other.

10. The composite cover of claim 5, wherein the composite cover has a perimeter flange and includes both the top strengthening patch and the bottom strengthening patch; and wherein the top strengthening patch and the bottom strengthening patch both extend onto the perimeter flange such that both the top strengthening patch and the bottom strengthening patch have a side profile with an S shape.

* * * * *